3,306,459
PLATE FILTER
John H. Bush, Needham, Mass., assignor to Millipore Filter Corporation, Bedford, Mass., a corporation of Massachusetts
Filed Dec. 15, 1964, Ser. No. 418,428
2 Claims. (Cl. 210—344)

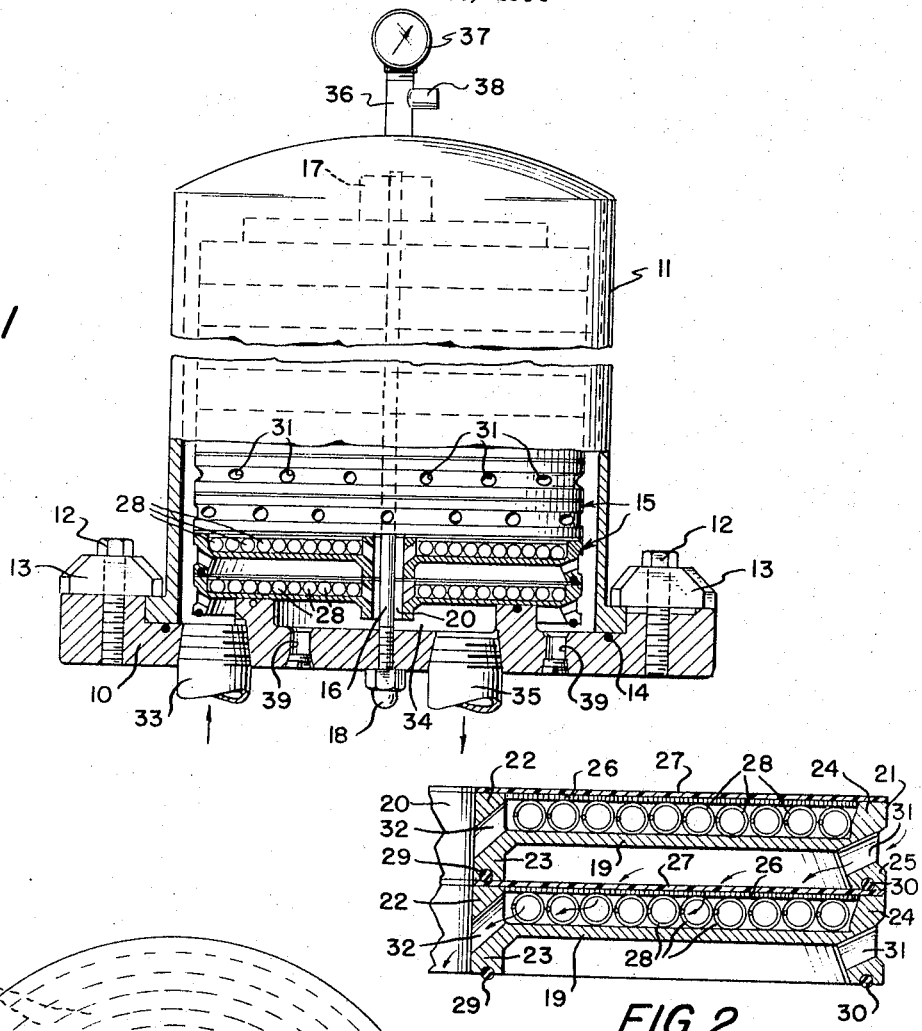

This invention relates to filter units of a type which may be used as individual units or assembled in a tier or stack within a cylindrical casing. In either case provision is made to circulate fluid through the filtering medium or element of each unit and into a central column for gravity discharge.

The invention aims to provide more particularly, a plate-like filter unit of special construction including special supporting means for the screen which supports the filtering element, supporting such screen at closely spaced points throughout its lower surface, and also to provide a passage for the filterate and for cleaning fluid which is, to a large extent, unobstructed. Such special construction is particularly advantageous when employing a filtering medium having minute pores of microscopic dimensions so as to make possible the removal of undesirable bacterial organisms and contaminants from a wide variety of fluids. However the improved plate-like filter unit may also be used in other filtering operations.

In accordance with the invention the plate-like filter unit comprises a disc, advantageously of stainless steel, having a rim portion with upper and lower annular flanges extending around its periphery, and also having a hub with upper and lower annular flanges and a central opening therethrough. Extending through the rim in equally spaced relation around its periphery there are lateral passageways terminating below the disc. The hub also has passageways, the entrances of which are above the disc and which discharge into the central opening of the hub. When two or more of these plate-like filter units are superposed one above the other the passages through the rim conduct the fluid to be filtered to the area above the next lower unit and on the surface of the filtering element of such unit. The filtrate below the filtering element flows through the hub passageways into the central opening.

A screen advantageously also of stainless steel and having extremely fine perforations is united along its outer and inner edges to the upper edges of the upper peripheral and inner flanges, respectively. This supporting screen may have such minute holes that it can support microporous plastic membrane filter elements, such as cellulose ester or nylon filters having pores less than, say, 10 microns in diameter. The total volume of the pores may constitute more than 80% of the total volume of the filter medium.

Under these circumstances it is important to provide means for supporting the screen at closely spaced points, and this is accomplished in accordance with the present invention by arranging between the upper surface of the disc and the lower surface of the supporting screen a series of wire helices, or tensioned coils of wire, of uniform diameter and arranged concentrically on the surface of the disc. No two of these helices which are adjacent to one another have the same pitch and thus they are prevented from nesting, or interengaging one another.

The invention will be better understood by considering the accompanying drawings and the description which follows.

In these drawings:

FIG. 1 is a view of a filtering apparatus embodying the invention in side elevation with the casing broken away and showing parts in central vertical section.

FIG. 2 is an enlarged view in central vertical section showing the right-hand portions of two superposed plate-like filter elements;

And FIG. 3 is a plan view of one filter unit showing parts broken away.

Referring now to these drawings, a filtering apparatus embodying the plate-like filter units of the invention is shown in FIG. 1. It comprises a base 10 and a cylindrical shell or casing 11 which is removably secured to the base by means of cap screws 12 and clamping members 13. A sealing ring 14 is provided at the foot of shell 11 to form a fluid tight joint with the base.

Resting one upon another in a stack or tier formation are a plurality of the plate-like filter units 15, the lowermost two of which are shown in central vertical section in FIGURE 1. Any desired number of the filter units may be placed in stack formation, and the entire series maintained in operative position with respect to one another and to base 10 by means of a vertical rod 16 having a nut 17 at its upper end and 18 at its lower end.

Each of the plate-like filter units comprises a stainless steel member having a disc 19 which projects from a hub portion 20 and which has a rim portion 21 extending around its periphery. The hub portion 20 comprises upper and lower flanges 22 and 23, and the rim portion 21 comprises upper and lower annular flanges 24 and 25.

Extending between the peripheral edges of the upper annular flange 22 and the upper annular flange 24 are filling the space surrounding these flanges there is a supporting screen member 26 for the filtering medium 27 or element. Filtering element 27 is a microporous plastic membrance such for example as cellulose ester or nylon, and having pores less than about 10 microns in diameter, and the total area of such pores may constitute more than 80% of the total area of the filtering element. The supporting screen 26 for such a filtering medium must be of special construction, and, in accordance with another feature of the invention, screen 26 has a vast multiplicity of closely spaced minute openings made by a photo-etching technique, the individual holes of which have a diameter of approximately .007 inch. These holes are indicated by the fine dots in FIGURE 3.

It is important to have the filtering element 27 supported in as near a smooth and level condition as possible, with all portions of its surface in the same plane, that is, without ripples or valleys therein. To this end the supporting screen 26 is itself supported at a large multiplicity of points throughout its area between the inner flange 22 and the outer flange 24 and this is accomplished by means of concentric rows 28 of wire helices or coils. These are shown in both FIGURES 1 and 2 in contact with one another and with the lower surface of screen 26 and resting on the upper surface of disc 19. They are also indicated by the dotted circles in FIGURE 3. These supporting members are advantageously made of stainless steel wire, approximately A.S. & W. gage No. 20 or 22. The wire is stiff and resilient so as to provide the desired support for the screen, and the various concentric coils are so arranged that no coils that are in contact with one another have the same pitch. This may be accomplished by stretching or tensioning such coils to different extents.

In stacking the filter units 15 one upon another the inner margins of the respective filter elements 27 are clamped between the inner upper flange 22 of one unit and the lower corresponding flange 23 of the unit next above. Also the outer margin of each filter element is clamped between the annular surface of the upper flange 24 of one filter unit and the lower flange 25 of the adjacent unit above. Sealing rings 29 and 30 are arranged in grooves in the lower flanges 23 and 25 of each filter unit, and these engage the upper surfaces of the respective filter elements 27 to provide leak-tight joints.

The rim portion of each filter unit is provided with equally spaced passageways 31 which extend inwardly and downwardly so as to terminate below the surface of disc 19 and cause the fluid to be filtered to flow into the area between the filter element 27 of one filter unit and the surface of disc 19 of the next unit above. After the fluid has passed through filtering element 27 it is discharged through downwardly sloping passageways 32 which connect the area just mentioned with the central opening 20 in the hub of each filter unit. These openings 20 of each filter unit being arranged in vertical alignment with one another constitute a discharge passage for the filtering apparatus.

The fluid to be filtered enters the apparatus through an inlet pipe 33, fills the interior of casing 11, enters the various filtering spaces through the passageways 31 described above, and the filtrate passes downwardly through the central tube formed by the several central openings 20 and is discharged into a sump 34 in base 10 from which it flows out through an outlet pipe 35.

The top of casing 11 is provided with a short upright pipe which supports a gage 37 by means of which the filtering pressure may be observed. A vent 38 is provided in the side of pipe 36, and drainage openings 39 are arranged in base 10, which are employed during the periodic cleaning operations necessary in the operation of the filtering apparatus.

One of the advantageous features of the concentric coil spring supports for the screen 26 is the provision of the closely spaced points of support of this screen by means of the upper portions of the extremely numerous turns of the wire coils. Another advantage is the fact that these coils being stretched so as to separate the turns to a considerable extent (several times the gage of the wire) provide the support just mentioned while at the same time leaving the drainage space beneath the screen unobstructed to a very considerable extent.

I claim:

1. A plate-like filter unit comprising a disc having rim and hub members, the rim member having upper and lower annular peripheral flanges and the hub having upper and lower annular flanges and also having a central opening therethrough, said rim having lateral passageways therethrough terminating below the disc for the entrance of fluid, and the hub having fluid discharge passageways therethrough having their entrances above the disc and extending to the central opening, a screen for supporting a filter element mounted on and united to the respective upper annular flanges, and a plurality of concentric wire coils for supporting the screen resting on the surface of the disc and having their upper portions engaging the screen, no two of said coils which are adjacent one another having the same pitch which prevents intermeshing of the coils.

2. A plate-like filter unit as claimed in claim 1 in which the screen is a perforated stainless steel sheet and has a vast multiplicity of closely spaced openings therethrough and the filter element is a microporous plastic membrane having pores less than about 10 microns in diameter.

References Cited by the Examiner

UNITED STATES PATENTS

| | | | |
|---|---|---|---|
| 2,232,153 | 2/1941 | Vohrer | 210—321 X |
| 2,602,548 | 7/1952 | Griffiths | 210—344 |
| 2,687,217 | 8/1954 | Kracklauer | 210—344 |
| 2,754,973 | 7/1956 | Muller | 210—344 |

W. S. BRADBURY, *Assistant Examiner.*

REUBEN FRIEDMAN, *Primary Examiner.*